3,080,400
2-HYDROXYMETHYL ANDROSTANES
Albert Bowers, John Edwards, and James C. Orr, all of Mexico City, Mexico, assignors, by mesne assignments, to Syntex Corporation, a corporation of Panama
No Drawing. Filed Aug. 3, 1961, Ser. No. 128,972
Claims priority, application Mexico Mar. 20, 1961
21 Claims. (Cl. 260—397.5)

The present invention relates to certain new cyclopentanophenanthrene derivatives and to a method for the preparation of the same.

More particularly, our invention relates to the novel 2α and 2β-hydroxymethyl, alkoxymethyl, aralkoxymethyl and acyloxymethyl derivatives of androstan-17β-ol, which may further possess a 17α-alkyl, alkenyl or alkynyl group; it also comprises the preparation of the esters of such compounds and the corresponding 19-nor-derivatives.

Such compounds are powerful anabolic agents having a favorable anabolic-androgenic ratio, they help to increase the protein metabolism and the deposition of calcium on the bone tissue; they further show anti-estrogenic activity, lower the cholesterol level in the blood and inhibit the secretion of gonadotropins by the pituitary gland.

The 17α-alkenyl and 17α-alkynyl compounds further exhibit progestational activity.

The novel compounds object of our invention are represented by the following formula:

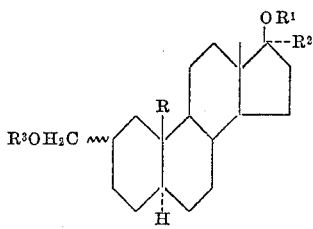

In the above formula, R represents hydrogen or methyl; $R^1$ represents hydrogen or an acyl group derived from a carboxylic acid of 1 to 12 carbon atoms; $R^2$ represents hydrogen, a lower alkyl, alkenyl or alkynyl group such as methyl, ethyl, propyl, vinyl, ethynyl or propynyl; $R^3$ represents hydrogen, a lower alkyl group of 1 to 8 carbon atoms, a lower aralkyl group of up to 8 carbon atoms or an acyl group derived from a carboxylic acid of 1 to 12 carbon atoms. The wavy line at C–2 indicates the α or β configuration for the substituent at such position.

The acyl groups referred to above, derive from a carboxylic acid of less than 12 carbon atoms, saturated or unsaturated, of straight, branched, cyclic or mixed cyclic-aliphatic chain, substituted or not with hydroxy, lower alkoxy such as methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and β-chloropropionate.

In our copending patent application Serial No. 128,974, filed of even date, there is described the preparation of 2-formyl-$\Delta^2$-androstenes starting from 2-alkoxymethylene derivatives of dihydroallotestosterone, of 19-nor-dihydroallotestosterone as well as of their 17α-alkenyl, alkynyl or alkyl substituted derivatives, which upon reduction with a double metal hydride produce the corresponding 3-hydroxy compounds; on further treatment with acid, the latter give rise to the formation of the 2-formyl-$\Delta^2$-androstenes and 19-nor-androstenes.

The novel compounds object of the present invention possessing a 2-hydroxymethyl group in the α-configuration and further having a 17α-alkyl group, are obtained by reduction with an alkali metal in liquid ammonia of the 2-formyl-17β-hydroxy-$\Delta^2$-androstenes and of their 19-nor-analogs; by esterification of such compounds there are obtained the corresponding mono- and di-esters.

The process set forth above is illustrated by the following series of reactions:

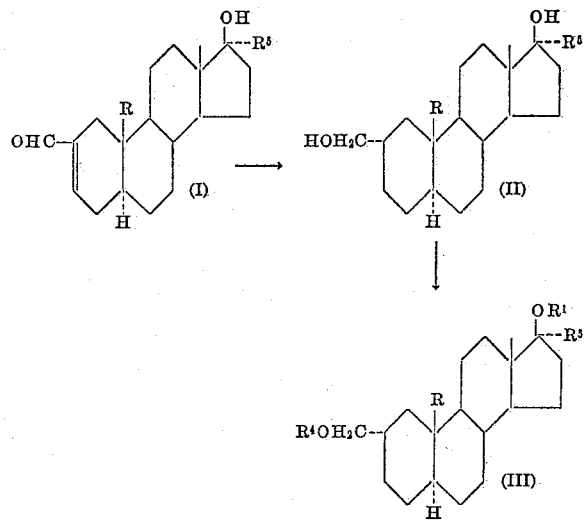

In the above formulas R and $R^1$ have the same meaning expressed previously; $R^4$ represents an acyl group of less than 12 carbon atoms and $R^5$ represents hydrogen or alkyl.

In practice, a solution of a 2-formyl-$\Delta^2$-androsten-17β-ol (I:R=Me), prepared as described in our copending patent application Serial No. 128,974, in ether, dioxane or a mixture of both solvents, is reduced with an alkali metal, preferably lithium, in liquid ammonia, under anhydrous conditions, followed immediately by the destruction of the complex formed with a proton donor such as methanol; there is thus produced in good yield the corresponding 2α-hydroxymethyl compound (II:R=Me). Esterification of such compounds with anhydrides or chlorides derived from carboxylic acids of 1 to 12 carbon atoms in pyridine or benzene solution produces the 2,17-diesters (III: R=Me, $R^5$=hydrogen) or 2-monoesters (III: R=Me, $R^5$=alkyl). The C–2 monoesters may be esterified at C–17 with the same or with a different acid anhydride or chloride, in benzene solution and in the presence of p-toluenesulfonic acid.

The C–17 monoesters are obtained by selective saponification of the 2-acyloxymethyl group of the 2,17-diesters.

The 2α-hydroxymethyl and acyloxymethyl androstanes having a 17α-alkenyl or alkynyl group are obtained by the method illustrated by the following series of reactions:

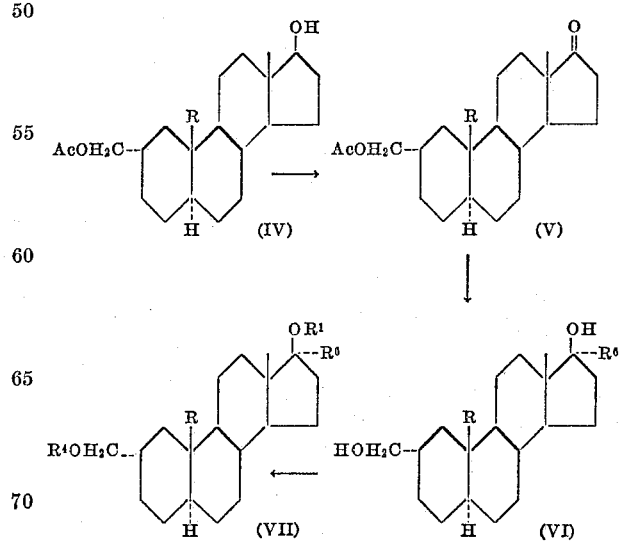

In the above formulas, R, R¹ and R⁴ have the same meaning set forth above; R⁶ represents a lower alkenyl or alkynyl group and Ac represents the acetyl group.

In practicing the process outlined above, 2α-hydroxymethyl-androstan-17β-ol (II: R=Me, R⁵=hydrogen) is selectively acetylated at C-2 with approximately 1 molar equivalent of acetic anhydride in pyridine solution and at low temperature, preferably between 0° and 5° C., to produce 2α-acetoxymethyl-androstan-17β-ol (IV: R=Me); oxidation of the latter with chromic acid in acetone or acetic acid produces 2α-acetoxymethyl-androstan-17-one (V: R=Me). By treatment of the latter compound with sodium or potassium acetylide, or with the sodium or potassium salt of another lower alkyne, there are obtained the 2α-hydroxymethyl-17α-alkynyl compounds (VI: R=Me, R⁶=alkynyl), which upon catalytic hydrogenation in the presence of a palladium catalyst, preferably palladium on calcium carbonate, and in pyridine solution, produce the corresponding 17α-alkenyl derivatives (VI: R=Me, R⁶=alkenyl).

Alternatively, the 17α-alkenyl and alkynyl compounds may be obtained by treating 2α-acetoxymethyl-androstan-17-one (V: R=Me) with an alkenyl or alkynyl magnesium bromide, with simultaneous saponification of the acetoxymethyl group.

The mono- and di-esters of these compounds (VII) are obtained in accordance with the methods of esterification described previously for the 17α-alkyl derivatives.

In the same manner, the processes which we have just described are applied to the 2-formyl-19-nor-Δ²-androstenes, thus producing 2α-hydroxymethyl-19-nor-androstan-17β-ol, the corresponding 17α-alkyl, alkenyl and alkynyl derivatives as well as the mono- and di-esters of such compounds.

The novel compounds possessing a 2β-hydroxymethyl or 2β-acyloxymethyl group are obtained by the process illustrated by the following series of reactions:

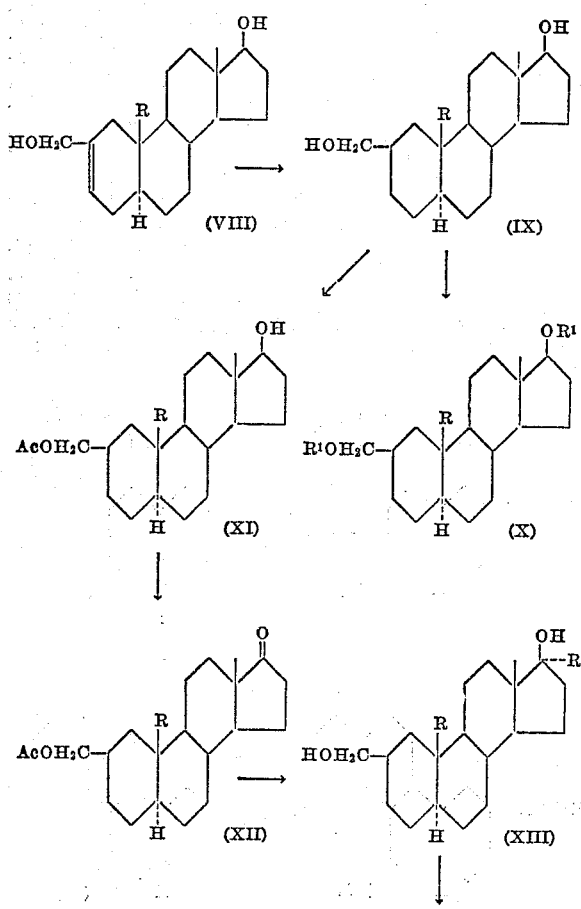

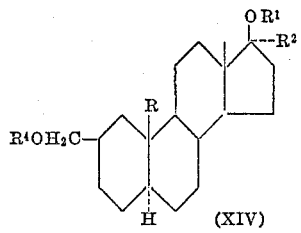

In the above formulas, R, R¹, R² and R⁴ have the same meaning set forth previously; Ac represents the acetyl radical.

In practicing the process outlined above, 2-hydroxymethyl-Δ²-androsten-17β-ol or its corresponding 19-nor derivative (VIII), is obtained by reducing with sodium borohydride 2-formyl-Δ²-androsten-17β-ol and 2-formyl-19-nor-Δ²-androsten-17β-ol as described in our patent application Serial No. 128,974, filed of even date. By hydrogenation of such compounds in the presence of a palladium catalyst, such as palladium on charcoal, palladium on barium sulfate or palladium on calcium carbonate, with the uptake of one molar equivalent of hydrogen, there are obtained 2β-hydroxymethyl-androstan-17β-ol and 2β-hydroxymethyl-19-nor-androstan-17β-ol (IX). Suitable solvents for this hydrogenation are the aliphatic alcohols such as methanol, ethanol or propanol; ethyl acetate, dioxane, tetrahydrofuran, etc. Modifications in the reaction temperature, pressure and catalyst used do not vary considerably the course of the reaction.

By esterification of the 2β-hydroxymethyl-androstanes by conventional methods with anhydrides or chlorides of carboxylic acids of the type set forth above, there are obtained the 2,17-diesters (X), which by selective hydrolysis of the acyloxymethyl group at C-2 afford the 17-monoesters.

By treatment of 2β-hydroxymethyl-androstan-17β-ol or its 19-nor-derivative with approximately 1 molar equivalent of acetic anhydride in pyridine solution and at room temperature, preferably between 0° and 5° C., there are obtained 2β-acetoxymethyl-androstan-17β-ol and 2β-acetoxymethyl-19-nor-androstan-17β-ol (XI) which by oxidation with an 8N solution of chromic acid, in acetone solution, or with 1.1 equivalents of chromic acid in acetic acid, furnish the 17-ketones (XII).

For preparing the 17α-alkyl, alkenyl or alkynyl derivatives (XIII), 2β-acetoxymethyl-androstan-17-one or its 19-nor derivative is treated with an organometallic halide, at the reflux temperature for 2 to 5 hours or overnight at room temperature. Adequate solvents for this reaction are the aromatic hydrocarbons, such as benzene, toluene or xylene, or other organic solvents inert to this reaction such as ether or tetrahydrofuran. In this manner the 17-keto group is converted into the 17β-hydroxy-17α-alkyl, 17β-hydroxy-17α-alkenyl or 17β-hydroxy-17α-alkynyl groupings, according to the Grignard reagent employed for the reaction, simultaneously, the 2β-acetoxymethyl group is hydrolyzed to produce the 17α-substituted 2β-hydroxymethyl-17β-hydroxy-androstanes. For example, by reacting 2β-acetoxymethyl-androstan-17-one with methyl-magnesium bromide, there is obtained 2β-hydroxymethyl-17α-methyl-androstan-17β-ol.

By esterification of the 17α-substituted 2β-hydroxymethyl-androstanes and 19-nor-androstanes, by conventional methods, there are obtained the C-2 monoesters, which on treatment with the same or a different acid anhydride or chloride in benzene solution and in the presence of p-toluenesulfonic acid, produce the diesters. The selective hydrolysis of the 2β-acyloxymethyl group produces the 17-monoesters.

Alternatively, the 17α-alkyl substituted compounds may be obtained by treating the 17-ketones (XII) with an alkyl-lithium.

The 17α-alkynyl substituted compounds are also obtained by treating 2β-acetoxymethyl-androstan-17-one or its 19-nor derivative with sodium or potassium acetylide or with the sodium or potassium salt of another alkine. By partial hydrogenation of the 2β-hyroxymethyl-17α-alkynyl-17-β-hydroxyandrostanes and 19-nor-androstanes, in the presence of a palladium catalyst such as palladium on calcium carbonate, and using an amine as solvent, preferably pyridine, there are obtained the 2β-hydroxy-methyl-17α-alkenyl-17β-hydroxy-androstanes and 19-nor-androstanes.

The novel 2α and 2β-alkoxy and 2α- and 2β-aralkoxy compounds object of our invention are obtained by the method illustrated by the following equation:

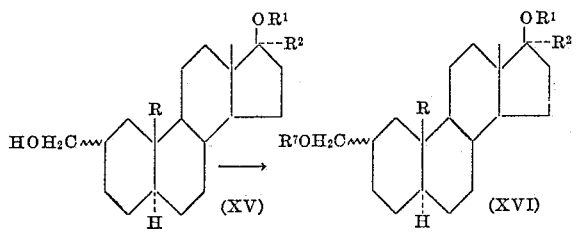

In the above formulas, R, R¹ and R² have the same meaning set forth previously; R⁷ represents a lower alkyl or aralkyl group; the wavy line indicates the α or β configuration for the substituent at C-2.

In practicing the process outlined above, a 17-ester of 2-hydroxymethyl-androstan-17β-ol, which may further possess a substituent at C-17α of the type set forth previously, or the corresponding 19-nor derivatives (XV), is reacted at room temperature with an excess of an ether solution of a diazoalkane, such as diazomethane or diazoethane, and in the presence of a catalyst, such as boron trifluoride or aluminum chloride, and there are produced the 2-methoxymethyl or 2-ethoxymethyl derivatives (XVI: R⁷=Me, Et; R¹=acyl). Saponification of these compounds by conventional methods affords the free ethers.

Alternatively, the etherification may be effected by reacting at the reflux temperature the 2-hydroxymethyl compounds of Formula XV with an alkyl or aralkyl halide, preferably with an alkyl or aralkyl iodide, in an organic solvent such as acetone and in the presence of a base such as potassium carbonate, or by treatment with an alkyl sulfate in acetone solution and in the presence of a base, preferably potassium hydroxide, at room temperature.

The following examples serve to illustrate but are not intended to limit the scope of the invention:

*Example I*

A solution of 5 g. of 2-formyl-Δ²-androsten-17β-ol in 100 cc. of a mixture of dioxane and ether (1:1) was slowly added to a stirred solution of 1.5 g. of lithium metal in 750 cc. of liquid ammonia. At the end of the addition there was added dropwise 10 cc. of methanol until the blue color of the solution was discharged. The ammonia was evaporated, water was added to the residue and the product was extracted with ether; the organic extract was washed to neutral, dried over anhydrous sodium sulfate and evaporated to dryness. Chromatography of the residue on 250 g. of washed alumina, followed by recrystallization of the solid fractions from acetone-hexane afforded 2α-hydroxymethyl-androstan-17β-ol.

A mixture of 1 g. of the above compound, 4 cc. of pyridine and 2 cc. of acetic anhydride was heated on the steam bath for 1 hour, then poured into water and the precipitate formed was collected, washed with water to neutral and dried. Crystallization from acetone-hexane yielded 2α-acetoxymethyl-androstan-17β-ol acetate.

*Example II*

By following the method of the preceding example, but using 2-formyl-19-nor-Δ²-androsten-17β-ol as starting material, there was obtained 2α-hydroxymethyl-19-nor-androstan-17β-ol and its corresponding diacetate.

*Example III*

A solution of 5 g. of 2-hydroxymethyl-androstan-17β-ol in 20 cc. of pyridine was cooled at 0° C., treated with 1.8 g. of acetic anhydride (1.1 equivalents) and allowed to react at 0° C., for 24 hours; it was then poured into water, extracted with ethyl acetate and the extract was washed to neutral, dried and evaporated to dryness. The residue was chromatographed on washed alumina, thus affording 2α-acetoxy-methyl-androstan-17β-ol.

A stirred solution of 3 g. of the above compound in 60 cc. of acetone was treated with 5 cc. of an 8 N solution of chromic acid (prepared in 23% sulfuric acid) and the mixture was kept at room temperature for 10 minutes. At the end of this time the mixture was poured into water and the precipitate formed was collected, thus giving 2α-acetoxymethyl-androstan-17-one.

A solution of 2 g. of the above ketone in 60 cc. of anhydrous benzene was added under an atmosphere of nitrogen to a solution of potassium t-amyloxide, prepared previously from 1.4 g. of potassium and 30 cc. of t-amyl alcohol. A slow stream of purified acetylene was introduced into the resulting solution for 40 hours and the solution was then poured into ice water and extracted with several portions of benzene. The combined extract was washed to neutral, the organic layer was dried over anhydrous sodium sulfate and evaporated to dryness under vacuum. The residue was chromatographed on 50 times its weight of washed alumina and the crystalline fractions were recrystallized from acetone-hexane, thus furnishing 2α-hydroxymethyl-17α-ethynyl-androstan-17-β-ol.

A mixture of 500 mg. of the above compound, 2 cc. of pyridine and 1 cc. of acetic anhydride was heated on the steam bath for 1 hour, poured into water and the precipitate formed was collected. There was thus obtained 2α-acetoxymethyl-17α-ethynyl-androstan-17β-ol.

In the same manner 2α-hydroxymehyl-17-nor-androstan-17β-ol was converted into 2α-acetoxymethyl-19-nor-androstan-17β-ol, 2α-acetoxymethyl-19-nor-androstan-17-one, 2α-hydroxymethyl-17α-ethynyl-19-nor-androstan-17β-ol and finally into 2α-acetoxymethyl-17α-ethynyl-19-nor-androstan-17β-ol.

*Example IV*

In accordance with the method of reduction described in Example I, there was treated 5 g. of 2-formyl-17α-methyl-Δ²-androsten-17β-ol and 5 g. of 2-formyl-17α-methyl-19-nor-Δ²-androsten-17β-ol with lithium in liquid ammonia to produce 2α-hydroxymethyl-17α-methyl-androstan-17β-ol and its corresponding 19-nor analog.

From a solution of 1 g. of 2α-hydroxymethyl-17α-methyl-androstan-17β-ol in 130 cc. of benzene free of thiophene there was distilled approximately 30 cc. in order to remove moisture; there was then added 0.52 cc. of pyridine and 1.5 cc. of undecenoyl chloride and the mixture was refluxed for 1 hour and evaporated to dryness; the residue was chromatographed on 30 g. of washed alumina, thus yielding 2α-undecenoyloxymethyl-17α-methyl-androstan-17β-ol.

*Example V*

A solution of 500 mg. of 2α-hydroxymethyl-androstan-17β-ol in 2 cc. of pyridine was treated with 1 cc. of caproic anhydride and the mixture was kept overnight at room temperature, then poured into water and the precipitate formed was collected, thus giving the caproate of 2-capronoxymethyl-androstan-17β-ol.

By the same methods, but using propionic, valeric and cyclopentylpropionic anhydrides as esterifying agents there were obtained the corresponding diesters of 2α-hydroxymethyl-androstan-17β-ol.

Example VI

A mixture of 1 g. of 2α-hydroxymethyl-17α-methyl-androstan-17β-ol, 50 cc. of benzene, 2 cc. of acetic anhydride and 500 mg. of p-toluenesulfonic acid was kept at room temperature for 48 hours, then diluted with water and the benzene layer was separated, washed with 5% sodium carbonate solution and water, dried over anhydrous sodium sulfate and evaporated to dryness under reduced pressure. By chromatography of the residue followed by crystallization of the solid fractions from acetone-ether there was obtained the acetate of 2α-acetoxymethyl-17α-methyl-androstan-17β-ol.

In the same manner, but using propionic, caproic, undecenoic and cyclopentylpropionic anhydrides as esterifying agents (of the latter two anhydrides, twice the amount was employed), there were obtained the propionate of 2α-propionoxymethyl-17α-methyl-androstan-17β-ol, the caproate of 2α-capronoxymethyl-17α-methyl-androstan-17β-ol, the undecenoate of 2α-undecenoyloxymethyl-androstan-17β-ol and the cyclopentylpropionate of 2α-cyclopentylpropionoxymethyl-androstan-17β-ol.

Example VII

A solution of 750 mg. of 2α-hydroxymethyl-17α-ethynyl-androstan-17β-ol in 20 cc. of pyridine was hydrogenated at room temperature and atmospheric pressure using 0.2 g. of 5% palladium on calcium carbonate catalyst (which had been previously reduced). After the uptake of 1 molar equivalent of hydrogen the catalyst was removed by filtration and the filtrate was evaporated to dryness under vacuum. The residue was dissolved in ethyl acetate, washed with hydrochloric acid to completely remove the pyridine and finally with water to neutral, dried and concentrated to a small volume. Crystallization from ethyl acetate-hexane afforded 2α-hydroxymethyl-17α-vinyl-androstan-17β-ol.

A mixture of 1 g. of 2α-hydroxymethyl-17α-vinyl-androstan-17β-ol, 10 cc. of pyridine and 1 cc. of acetyl chloride was kept at room temperature for 36 hours and then the solvent was removed under vacuum at a temperature below 60° C. By crystallization of the residue from methylene chloride-hexane there was obtained 2α-acetoxymethyl-17α-vinyl-androstan-17β-ol.

By the same method, but using 2α-hydroxymethyl-17α-ethynyl-19-nor-androstan-17β-ol as starting material there were successively obtained 2α-hydroxymethyl-17α-vinyl-19-nor-androstan-17β-ol and 2α-acetoxymethyl-17α-vinyl-19-nor-androstan-17β-ol.

Example VIII 1 g. of the acetate of 2α-acetoxymethyl-17α-methyl-androstan-17β-ol was dissolved in 50 cc. of a 1% solution of potassium hydroxide in methanol and the mixture was kept at room temperature for 4 hours, then neutralized with a few drops of acetic acid, concentrated to a small volume and diluted with water. The precipitate formed was collected, washed, dried and crystallized from acetone-ether, thus furnishing the 17-acetate of 2α-hydroxymethyl-17α-methyl-androstan-17β-ol.

By the same method the dipropionate, the dicaproate and the dicyclopentylpropionate of 17α-methyl-androstan-17β-ol, obtained in Example VI, were converted into the corresponding 17-monoesters.

Example IX

A solution of 20 g. of 2-hydroxymethyl-Δ²-androsten-17β-ol in 400 cc. of ethyl acetate was hydrogenated at room temperature and atmospheric pressure in the presence of 2 g. of 5% palladium on charcoal catalyst which had been previously reduced. After the uptake of 1 molar equivalent of hydrogen the catalyst was removed by filtration through celite and the filtrate was evaporated to dryness. Chystallization of the residue from methylene chloride-hexane afforded 2β-hydroxymethyl-androstan-17β-ol.

A mixture of 1 g. of the above compound, 5 cc. of pyridine and 5 cc. of propionic anhydride was allowed to react at room temperature overnight and then poured into water. The precipitate formed was collected by filtration to give the propionate of 2β-propionoxymethyl-androstan -17β-ol.

By the same method of esterification, but using acetic anhydride and caproic anhydride as esterifying agents there were obtained the acetate of 2β-acetoxymethyl-androstan-17β-ol and the caproate of 2β-capronoxymethyl-androstan-17β-ol.

Example X

A solution of 15 g. of 2β-hydroxymethyl-androstan-17β-ol in 60 cc. of pyridine was cooled to 0° C. and treated with 5.5 g. of acetic anhydride (1.1 equivalents). The mixture was allowed to react at 0° C. for 18 hours, then poured into water and extracted with ethyl acetate. The extract was washed to neutral, dried, evaporated to dryness and the residue was chromatographed on washed alumina, thus producing 2β-acetoxymethyl-androstan-17β-ol. A stirred solution of 10 g. of the above compound in 100 cc. of acetic acid was treated dropwise with a solution of 2.5 g. of chromic acid in 25 cc. of 80% acetic acid at a temperature between 15 and 20° C. The mixture was kept standing at room temperature for 1 hour, poured into ice cold salt solution and the precipitate formed was collected by filtration and washed with water to neutral, thus yielding 2β-acetoxymethyl-androstan-17-one, which was purified by crystallization from chloroform-methanol.

A solution of 5 g. of 2β-acetoxymethyl-androstan-17-one in 100 cc. of anhydrous benzene free of thiophene was added little by little to 25 cc. of a 4 N solution of methyl magnesium bromide in ether and the mixture was refluxed under anhydrous conditions for 3 hours; after cooling, the mixture was cautiously poured into water, acidified with hydrochloric acid and the benzene layer was separated. The aqueous phase was extracted several times with ethyl acetate and the extract was combined with the benzene solution. The organic solution was washed to neutral, dried over anhydrous sodium sulfate and evaporated to dryness under reduced pressure. Crystallization of the residue from acetone-hexane afforded 2β-hydroxymethyl-17α-methyl-androstan-17β-ol.

A mixture of 2.5 g. of the above compound, 100 cc. of acetic acid, 50 cc. of acetic anhydride and 2.5 g. of p-toluenesulfonic acid was kept at room temperature for 18 hours, then poured into water, heated for 30 minutes on the steam bath to hydrolyze the excess of reagent and the precipitate formed was collected by filtration, and washed with water to neutral, thus producing the acetate of 2β-acetoxymethyl-17α-methyl-androstan-17β-ol.

By selective saponification by treatment with 1% methanolic potassium hydroxide solution in accordance with the method of Example VIII, there was obtained the 17-acetate of 2β-hydroxymethyl-17α-methyl-androstan-17β-ol.

Example XI

A solution of 5 g. of 2β-acetoxymethyl-androstan-17-one in 100 cc. of anhydrous ether was added dropwise to a solution of propargyl magnesium bromide (prepared from 6.8 g. of propargyl bromide, 1.4 g. of magnesium and 200 cc. of ether). The mixture was refluxed with stirring for 5 hours, cooled and poured into 500 cc. of 5% ammonium chloride solution; the ether layer was separated, washed with water to neutral, dried over anhydrous sodium sulfate and evaporated to dryness under vacuum. Crystallization of the residue from methanol furnished 2β-hydroxymethyl - 17α - propargyl-androstan-17β-ol.

1 g. of the above compound was dissolved in 20 cc. of benzene and treated with 2 cc. of propionic anhydride and 0.5 g. of p-toluenesulfonic acid. The mixture was kept overnight at room temperature, then diluted with water and stirred for 30 minutes to hydrolyze the excess of reagent; the benzene layer was separated and washed with 5% sodium carbonate solution and finally with water to neutral, dried over anhydrous sodium sulfate and evaporated to dryness under vacuum. Chromatography of the residue on washed alumina followed by crystallization of the solid fractions from acetone-hexane afforded the propionate of 2β-propionoxymethyl-17α-propargyl-androstan-17β-ol.

*Example XII*

A solution of 2 g. of 2β-acetoxymethyl-androstan-17-one in 60 cc. of anhydrous benzene was added under an atmosphere of nitrogen to a solution of potassium amyloxide previously prepared from 1.4 g. of potassium in 30 cc. of amyl alcohol. A slow stream of purified acetylene was then introduced into the resulting solution for 40 hours and the solution was then poured into ice water and extracted with several portions of benzene. The combined extract was washed to neutral, the organic layer was dried over anhydrous sodium sulfate and evaporated to dryness under vacuum. The residue was chromatographed on 50 times its weight of washed alumina and the solid fractions were recrystallized from acetone-hexane, thus yielding 2β-hydroxymethyl-17α-ethynyl-androstan-17β-ol.

A mixture of 500 mg. of the above compound, 2 cc. of pyridine and 1 cc. of acetic anhydride was heated for 1 hour on the steam bath and poured into water. The precipitate formed was collected, thus giving 2β-acetoxymethyl-17α-ethynyl-androstan-17β-ol.

*Example XIII*

A solution of 2 g. of 2β-hydroxymethyl-17α-ethynyl-androstan-17β-ol in 50 cc. of pyridine was hydrogenated at room temperature and atmospheric pressure in the presence of 0.6 g. of 5% palladium on calcium carbonate (which had been previously reduced). After the uptake of 1 molar equivalent of hydrogen the catalyst was removed by filtration and the filtrate was evaporated to dryness under vacuum. The residue was dissolved in ethyl acetate, washed with hydrochloric acid to remove all of the pyridine and finally with water to neutral, dried and concentrated to a small volume. Crystallization from ethyl acetate-hexane furnished 2β-hydroxymethyl-17α-vinyl-androstan-17β-ol. Subsequent acetylation with acetic anhydride in pyridine gave 2β-acetoxymethyl-17α-vinyl-androstan-17β-ol.

A mixture of 500 mg. of the above compound, 25 cc. of benzene, 2 cc. of cyclopentylpropionic anhydride and 250 mg. of p-toluenesulfonic acid was kept standing at room temperature for 48 hours and then diluted with water and stirred for 30 minutes to hydrolyze the excess of reagent; the benzene layer was separated, washed to neutral, dried over anhydrous sodium sulfate and evaporated to dryness. Crystallization from acetone-ether afforded the cyclopentylpropionate of 2β-acetoxymethyl-17α-vinyl-androstan-17β-ol.

*Example XIV*

By following the method of hydrogenation described in the preceding example, 500 mg. of the propionate of 2β-propionoxymethyl-17α-propargyl-androstan-17β-ol was converted into the propionate of 2β-propionoxymethyl-17α-propenyl-androstan-17β-ol.

*Example XV*

A suspension of 10 g. of 2-hydroxymethyl-19-nor-Δ²-androsten-17β-ol in 100 cc. of methanol was added to a suspension of 10% palladium on calcium carbonate which had been previously reduced and the mixture was hydrogenated at room temperature and atmospheric pressure until the equivalent of 1 mol of hydrogen had been absorbed. The catalyst was removed by filtration and the filtrate was evaporated until crystallization started, thus affording 2β-hydroxymethyl-19-nor-androstan-17β-ol.

The above compound was treated with 1.1 molar equivalents of acetic anhydride in pyridine, at 0° C., in accordance with the method of Example X. There was thus obtained 2β-acetoxymethyl-19-nor-androstan-17β-ol, which on oxidation with chromic acid in acetic acid afforded 2β-acetoxymethyl-19-nor-androstan-17-one.

5 g. of the above compound was treated with methyl magnesium bromide in accordance with the method of Example X, thus giving 2β-hydroxymethyl-17β-methyl-19-nor-androstan-17β-ol.

In the same manner, but using ethyl, vinyl and ethynyl magnesium bromide as alkylating agents, there were obtained, respectively: 2β-hydroxymethyl-17α-ethyl-19-nor-androstan-17β-ol, 2β-hydroxymethyl-17α-vinyl-19-nor-androstan-17β-ol and 2β-hydroxymethyl-17α-ethynyl-19-nor-androstan-17β-ol.

*Example XVI*

A solution of 1 g. of the caproate of 2α-hydroxymethyl-17α-methyl-androstan-17β-ol, obtained in accordance with Example VIII, in 100 cc. of ether was cooled to 0–5° C. and treated with an ether solution of diazomethane (prepared from 5 g. of nitrosomethylurea) and 3 drops of recently distilled boron trifluoride etherate. The mixture was kept at room temperature for 1 hour, treated with a few drops of acetic acid to destroy the excess of diazomethane and evaporated to dryness, thus giving the caproate of 2α-methoxymethyl-17α-methyl-androstan-17β-ol.

A solution of 500 mg. of the above compound in 50 cc. of methanol was treated with a solution of 500 mg. of potassium hydroxide in 1 cc. of water and the mixture was kept overnight at room temperature; it was then neutralized with acetic acid, concentrated to a small volume and diluted with water until complete precipitation of the product, which was collected and crystallized from methylene chloride-hexane, thus furnishing 2α-methoxymethyl-17α-methyl-androstan-17β-ol.

*Example XVII*

A mixture of 2 g. of 2β-hydroxymethyl-17α-vinyl-19-nor-androstan-17β-ol, 100 cc. of anhydrous acetone, 10 cc. of methyl iodide and 2 g. of anhydrous potassium carbonate was refluxed for 48 hours under anhydrous conditions. At the end of this time the mixture was poured into water, extracted with ethyl acetate and the organic extract was washed with water, dried over anhydrous sodium sulfate and evaporated to dryness under vacuum. The residue was purified by chromatography on washed alumina, thus giving 2β-methoxymethyl-17α-vinyl-19-nor-androstan-17β-ol. By esterification of this compound with propionic anhydride in benzene solution and in the presence of p-toluenesulfonic acid there was obtained the propionate of 2β-methoxymethyl-17α-vinyl-19-nor-androstan-17β-ol.

*Example XVIII*

By following the method of the preceding example, but using ethyl, propyl or benzyl iodide instead of methyl iodide, the acetate of 2β-hydroxymethyl-17α-methyl-androstan-17β-ol, obtained by the method of Example X, was converted into 2β-ethoxymethyl-17α-methyl-androstan-17β-ol acetate, 2β-propoxymethyl-17α-methyl-androstan-17β-ol acetate and 2β-benzyloxymethyl-17α-methyl-androstan-17β-ol acetate. By subsequent saponification of these compounds, in accordance with the method of Example XVI, there were obtained the respective free compounds.

*Example XIX*

A mixture of 1 g. of the acetate of 2β-acetoxymethyl-androstan-17β-ol and 50 cc. of 1% potassium hydroxide solution was kept standing at 0° C. for 2 hours; it was then neutralized with a few drops of acetic acid, poured into water and extracted with ethyl acetate; the organic extract was washed to neutral, dried and evaporated to dryness under vacuum. Chromatography of the residue afforded the 17-acetate of 2β-hydroxymethyl-androstan-17β-ol.

500 mg. of the above compound was treated with an excess of diazomethane, in the presence of borontrifluoride, folowing the method of Example XVI, to produce the acetate of 2β-methoxymethyl-androstan-17β-ol.

A solution of 300 mg. of the above compound in 50 cc. of methanol was refluxed for 1 hour with 150 mg. of potassium hydroxide, cooled, poured into water and the precipitate formed was collected and washed to neutral, thus giving 2β-methoxymethyl-androstan-17β-ol.

*Example XX*

A solution of 250 mg. of the above ether in 1 cc. of pyridine was treated with 0.5 cc. of benzoyl chloride and heated on the steam bath for 1 hour; the mixture was then cooled, poured into water and the precipitate formed was collected and recrystallized from chloroform-methanol, thus furnishing the benzoate of 2β-methoxymethyl-androstan-17β-ol.

*Example XXI*

There was repeated the preceding example, but using the acetate of 2α-acetoxymethyl-19-nor-androstan-17β-ol as starting material, thus obtaining successively the acetate of 2α-hydroxymethyl-19-nor-androstan-17β-ol, the acetate of 2α-methoxymethyl-19-nor-androstan-17β-ol, 2α-methoxymethyl-19-nor-androstan-17β-ol and the benzoate of 2α-methoxymethyl-19-nor-androstan-17β-ol.

*Example XXII*

A solution of 500 mg. of the acetate of 2β-hydroxymethyl-17α-methyl-androstan-17β-ol in 75 cc. of ether was treated with an excess of an ether solution of diazoethane in the presence of 10 mg. of aluminum chloride as catalyst and the mixture was allowed to react at room temperature for 1 hour; the excess of reagent was destroyed with a few drops of acetic acid and the mixture was evaporated to dryness, thus giving the acetate of 2β-ethoxymethyl-17α-methyl-androstan-17β-ol, identical with the one obtained in Example XVIII.

*Example XXIII*

By following the method of esterification described in Example VI, of 2 g. of 2α-acetoxymethyl-17α-ethylnyl-androstan-17β-ol, obtained in Example VI, was treated with cyclopentylpropionic anhydride in benzene solution and in the presence of p-toluenesulfonic acid, thus giving the cyclopentylpropionate of 2α-acetoxymethyl-17α-ethynyl-androstan-17β-ol.

The above compound was selectively saponified at C-2, in accordance with the method of Example VIII, and the resulting 2α-hydroxymethyl compound was treated with methyl iodide in acetone and in the presence of anhydrous potassium carbonate, by following the procedure described in Example XVII; there was thus finally obtained the cyclopentylpropionate of 2α-methoxymethyl-17α-ethynyl-androstan-17β-ol.

We claim:
1. A compound of the following formula:

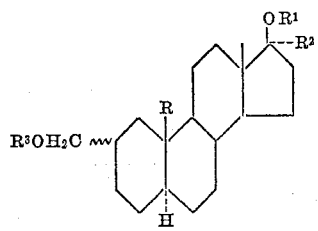

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of hydrogen, lower alkyl, lower alkenyl and lower alkynyl and $R^3$ is selected from the group consisting of an alkyl group containing from 1 to 8 carbon atoms, and aralkyl group containing up to 8 carbon atoms and a hydrocarbon carboxylic acyl group of less than 12 carbon atoms.

2. The 2-lower alkoxymethyl-androstan-17β-ol.
3. 2α-methoxymethyl-androstan-17β-ol.
4. 2β-ethoxymethyl-androstan-17β-ol.
5. 2α-methoxymethyl-17α-methyl-androstan-17β-ol.
6. The cyclopentylpropionate of 2α-methoxymethyl-17α-ethynyl-androstan-17β-ol.
7. The caproate of 2α-methoxymethyl-17α-methyl-androstan-17β-ol.
8. The hydrocarbon carboxylic acid esters of less than 12 carbon atoms of 2-hydroxymethyl-androstan-17β-ol.
9. The propionate of 2α-propionoxymethyl-androstan-17β-ol.
10. The caproate of 2α-capronoxymethyl-androstan-17β-ol.
11. 2α-acetoxymethyl-17α-ethynyl-androstan-17β-ol.
12. A compound of the following formula:

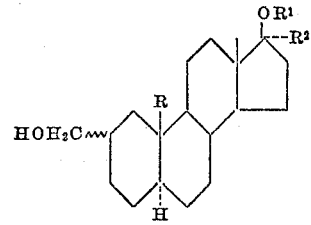

wherein R is selected from the group consisting of hydrogen and methyl; $R^1$ is selected from the group consisting of hydrogen and a hydrocarbon carboxylic acyl group of less than 12 carbon atoms; and $R^2$ is selected from the group consisting of hydrogen, lower alkyl, lower alkenyl and lower alkynyl.

13. 2-hydroxymethyl-androstan-17β-ol.
14. 2-hydroxymethyl-19-nor-androstan-17β-ol.
15. 2-hydroxymethyl-17α-ethynyl-androstan-17β-ol.
16. 2-hydroxymethyl-17α-methyl-androstan-17β-ol.
17. 2-hydroxymethyl-17α-vinyl-androstan-17β-ol.
18. 2-hydroxymethyl-17α-methyl-19-nor-androstan-17β-ol.
19. 2-hydroxymethyl-17α-ethynyl-19-nor-androstan-17β-ol.
20. A process for preparing a 2α-hydroxymethyl-androstan-17β-ol comprising reducing a 2-formyl-Δ²-androsten-17β-ol with an alkali metal in liquid ammonia.
21. A process for preparing a 2β-hydroxymethyl-androstan-17β-ol comprising hydrogenating a 2-hydroxymethyl-Δ²-androsten-17β-ol in the presence of a palladium catalyst.

No references cited.